Jan. 3, 1967  LE GRAND H. LULL  3,295,861
HOD BUGGY
Filed Nov. 17, 1964
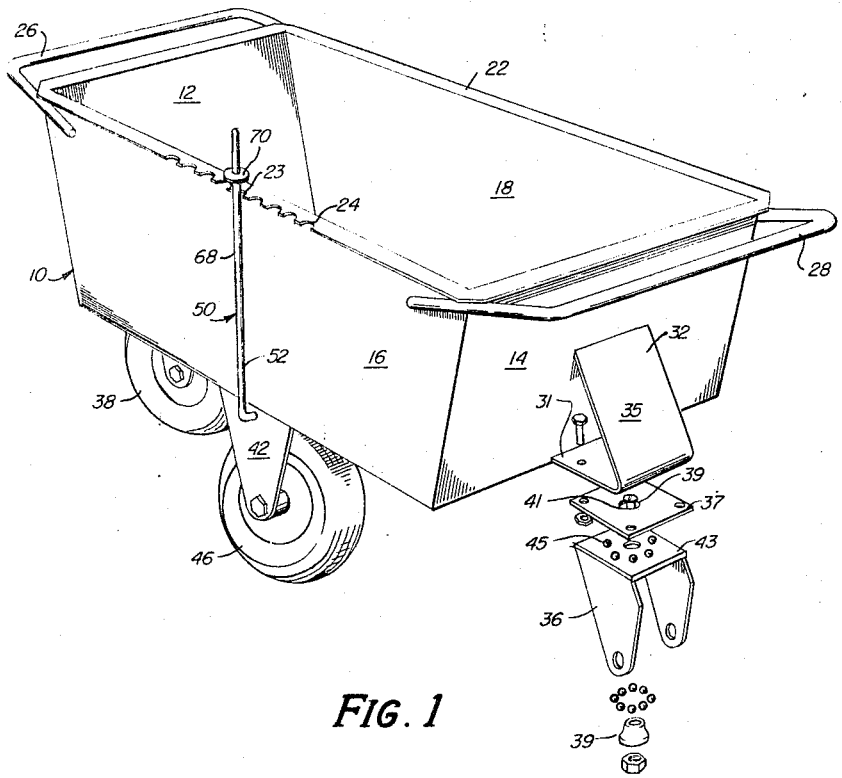
FIG. 1
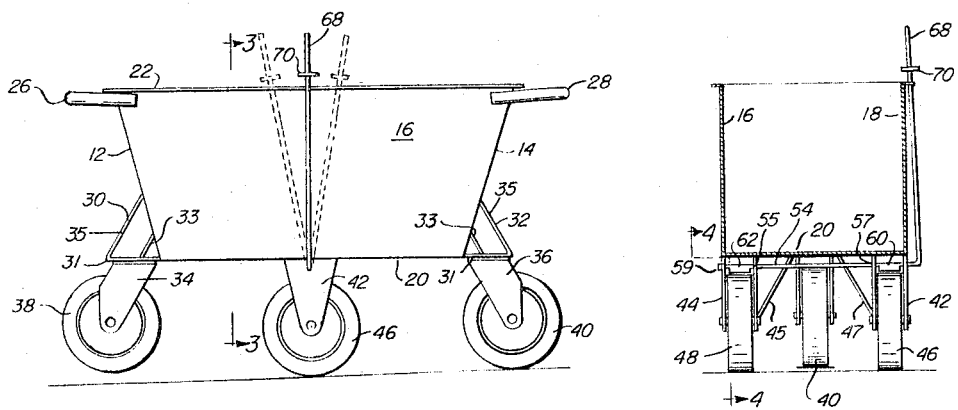
FIG. 2
FIG. 3
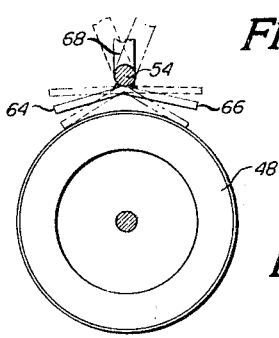
FIG. 4
INVENTOR.
LE GRAND H. LULL
BY *William F. Woods*
ATTORNEY

United States Patent Office 3,295,861
Patented Jan. 3, 1967

3,295,861
HOD BUGGY
Le Grand H. Lull, 5501 Woodlawn Blvd.,
Minneapolis, Minn. 55417
Filed Nov. 17, 1964, Ser. No. 411,835
8 Claims. (Cl. 280—47.16)

This invention relates to a hod buggy for use by building contractors, masons, construction firms and others. In particular, it concerns a mobile mortar or concrete handling tank adapted for use on the ground, on scaffolding or at building sites where rapid, safe, and efficient handling of such materials is required.

The general object of the invention is to provide an improved hod buggy. Other objects of the invention are: to provide an improved hod buggy characterized by novel wheeled means for supporting the same; to provide improved apparatus of this type including novel means for braking and controlling the movement of the wheels; to provide in a mobile hod buggy novel means for facilitating operator control of the wheel braking and control mechanism; to provide in apparatus of this type novel means for setting the brake control mechanism in a selected position; to provide in a mobile hod buggy novel means for providing a three point wheeled support therefor; and in general, to provide an improved hod buggy which is highly versatile and dependable in operation, simple and inexpensive to construct, and rugged and long wearing in service.

The foregoing and other objects and advantages of the invention will become apparent from a consideration of the following detailed description taken in conjunction with the drawings wherein a representative embodiment of the invention is shown by way of illustration and not by way of limitation.

In the drawings:

FIGURE 1 is a perspective view of the hod buggy with one of the swivel wheel mounting assemblies being exploded apart for clarity;

FIGURE 2 is a side elevation view of the invention with the dotted lines indicating different angular positions of the parking brake handle;

FIGURE 3 is a view, partially in section, taken on the line 3—3 of FIGURE 2; and FIGURE 4 is an enlarged fragmentary view, partially in sectiin, taken on the line 4—4 of FIGURE 3, the dotted lines indicating varying angular positions of the parking brake handle.

Generally speaking, according to the principles of my invention, I provide a mobile hod buggy or mortar handling device including a load receiving receptacle that is rollably supported by means of a pair of center wheels of the fixed position type and swivelling caster type wheel at each end. The caster type wheels are supported from the receptacle a lesser distance than the center wheels so that the receptacle is rockably supported on the center wheels and either one of the swivelling end wheels. The device is equipped with a parking brake that can be operated from either end of the buggy. The handle of the brake extends upwardly from the center wheels into ratcheting engagement with a series of notches formed in a lip extending around the upper periphery of the receptacle. Rotation of the handle in an arc from the vertical sets a pair of friction plates against the wheels where they may be locked by the reception of the handle in one of the aforesaid notches.

Turning now to the drawing, the invention, designated in its entirety by the reference character A, includes a load receiving receptacle or tank 10 having inwardly and downwardly inclined end walls 12, 14, side walls 16, 18 and a bottom 20. A lip 22 is formed around the upper periphery of tank 10. On one side of tank 10 a series of longitudinally extending arcuate notches or indentations 23, 24 are formed in lip 22. Notches 23 and 24 extend in both directions from the middle of tank 10. Four notches 24 are provided on either side of the central notch 23. A pair of push pull handles 26, 28 are secured to the upper ends of the tank 10. Secured to each end of tank 10 are end wheels supporting brackets 30, 32 each having a straight section 31 extending outwardly from the bottom 20 and an angular section 35 connecting section 31 with a side of the tank. A brace 33 is also provided. Carried by brackets 30, 32 are depending forks 34, 36 which are mounted thereon for swivelling movements about substantially vertical axes at each end of tank 10. End wheels 38, 40 are rotatably carried by forks 34, 36, respectively. FIGURE 1 illustrates the swivel mounting means for fork 36 in greater detail. It should be apparent that identical means is used for mounting fork 34. The said means includes a plate 37 which is bolted to the underside of straight section 31 of bracket 32. The fork 36 is swivelly mounted below plate 37 by means of a capscrew and ball bearing assembly 39 which extends through a central aperture 41 in plate 37 and the top 43 of fork 36. A ball bearing support 45 is provided between the top of fork 36 and plate 37 to permit unlimited 360° rotation of the fork about a generally vertical axis.

Depending from the bottom 20 of tank 10 are laterally spaced pairs of center wheel supporting lugs 42, 44 which mount center wheels 46, 48 for rotation about a lateral axis between the ends of tank 10. Lugs 42, 44 are braced by supports 45, 47. Center wheels 46, 48 are of the fixed position type, that is to say, they do not swivel as do end wheels 38, 40. Preferably, all of the wheels 38, 40, 46 and 48 are of the same diameter but lugs 42 and 44 are designed to mount the center wheels 46, 48 at a slightly greater distance from the bottom of the tank as compared to the end wheels 38, 40. By thus lowering the axis of rotation of center wheels 46, 48 with respect to the axis of rotation of the end wheels 38, 40, tank 10 is provided with a three-point wheeled support. The load is carried at all times by the center wheels 46, 48 and either one but not both of the end wheels 38, 40. This permits easy and identical operation of the buggy from either end.

Also provided is a parking brake for the center wheels 46, 48, which may be operated from either end of the buggy. The parking brake, designated in its entirety by the reference character 50, includes a brake rod 52 having a laterally extending leg 54 which extends through lugs 42, 44, as at 55, 57 above center wheels 46, 48. A washer 59 anchors leg 54 of brake rod 52 against lateral movement. Leg 54, rotatably carried by lugs 42, 44 is equipped with laterally spaced friction members 60, 62 which brakingly engage wheels 46, 48 upon the pivoting of leg 54 about its axis. As shown in FIGURE 4, friction members 60, 62 each include a pair of downwardly diverging friction plates 64, 66 that are welded at their upper ends to leg 54. Integral with leg 54 of brake rod 52 is an upstanding handle 68 which extends upwardly from leg 54 in closely spaced relation to the side 16 of tank 10. Handle 68 and friction members 60, 62 are so arranged that when handle 68 is in a vertical position friction members 60, 62 are out of contact with wheels 46, 48. When handle 68 is pivoted to an angular position on either side of the vertical one of the friction plates 64, 66 of members 60, 62 is brought into braking engagement with both of the center wheels 46, 48. To positively lock the brake 50 in a selected position, either free of the wheels or in braking contact with them, I provide a ratchet means engageable with the handle 68 of the brake 50. This means includes the aforementioned notches 24 in that part of lip 22 which extends above side 16 of tank 10. As stated previously, notches 24 extend longitudinally in both directions from the center of tank 10 so that handle 68 may be urged into a selected angular position on either side of the axis of wheels 46, 48. Handle 68, made of spring steel is sprung slightly from the perpendicular towards side 16 of tank 10 to normally bias it into the notches 23 and 24. Slight outward pressure against the upper end of handle 68 is necessary to release it from the notches 24 in lip 22. A circular protective shield 70 is provided around handle 68 above lip 22 to eliminate the danger of getting a hand or finger caught between the handle 68 and lip 22. The friction plates 64, 66 of friction members 60, 62 lockingly engage the peripheries of wheels 46, 48 with varying amounts of contact pressure depending upon the angular position of handle 68. This permits adjustment of the handle 68 within the range provided by the neutral notch 23 and the notches 24 on either side of the vertical to compensate for varying loads, the inclination of the supporting surface upon which the buggy is propelled and to accommodate for the wear of the tires on the wheels.

In use, the hod buggy herein described may be wheeled along a scaffold, up or down inclined planks or along the ground by pushing or pulling movements from either end. When it is desired to park the buggy and hold it in a selected location, the operator may manipulate the brake 50 by grasping handle 68 thereof from either end and moving it out of the central notch 23 into a selected notch 24 on either side thereof. During the time the hod buggy is being propelled the handle 68 rests in the central notch 23 which is located directly above the axis of wheels 46 and 48.

It is evident that changes within the skill of those versed in the art may be made without departing from the spirit of the invention. In many instances features may be added; in other, features may be omitted. In the case of the receptacle it is clear that shapes other than those mentioned may be used without departure from the spirit of the invention. Where, as in the case of the receptacle, the wheel mounting structure and the braking system, the same or similar results may be acheived by the use of equivalents, substitution of the equivalent may be made without departing from the inventive concept.

It is intended that the patent shall cover, by summarization in the appended claims, all features of patentable novelty residing in the invention.

I claim:
1. In a hod buggy, the combination comprising:
   a load receiving receptacle having end walls, side walls and a bottom, said receptacle being provided with a lip along at least one of its upper side edges,
   a pair of laterally spaced center wheels rotatably supporting said receptacle between its ends,
   a swivelling wheel rotatably supporting said receptacle at each end thereof,
      the ground engaging peripheries of said center wheels extending from said receptacle a slightly greater distance than the ground engaging peripheries of said end wheels whereby to rockably support said receptacle on said center wheels and on alternate ones of said end wheels,
   a brake rod extending in spaced relation to a side and the bottom of said receptacle,
   means rotatably mounting said brake rod for limited pivotal movement,
   a friction member carried by said brake rod operable to move into and out of engagement with at least one of said center wheels upon the pivotal rotation of said brake rod, and
   ratchet means on a side of said receptacle including a series of inwardly extending notches in said rim adapted to receive and hold the handle portion of said brake rod whereby to lock said friction member in a selected position.

2. The combination described in claim 1 wherein said friction member includes a pair of friction plates having end portions engageable with circumferentially spaced portions of the wheel.

3. The combination described in claim 1 wherein the said notches in the lip of said body extend from either side of the middle of said body.

4. In a hod buggy, the combination comprising:
   a load receiving receptacle having end walls, side walls and a bottom,
   a pair of laterally spaced center wheels rotatably supporting said receptacle between its ends,
   swivelling wheel rotatably supporting said receptacle at each end thereof,
      said swivelling wheels having ground engaging peripheries closer to the bottom of said body than the ground engaging peripheries of said supporting wheels,
   a brake rod pivotally mounted for rotation about an axis substantially parallel to and adjacent the axis of rotation of said supporting wheels,
      said brake rod including a laterally extending braking leg adjacent said supporting wheels and an upstanding handle extending adjacent a side of said body,
   a pair of spaced braking members secured to the said braking leg,
      said braking members each including friction members selectively movable into and out of braking contact with said supporting wheels upon the rotation of said brake rod, and
   ratchet means on said body for locking the said handle of said brake rod in a selected one of several angular positions.

5. The combination described in claim 4 wherein said ratchet means includes an outwardly extending lip on the side of said body adjacent said upstanding handle, said lip having a series of closely spaced longitudinally extending handle receiving notches, said handle being selectively receivable in one of the said notches of said lip.

6. The combination described in claim 4 wherein said handle is normally biased into engagement with the notches in said lip.

7. The combination described in claim 6 wherein said handle is provided with a protective shield above said body.

8. The combination described in claim 4 wherein the notches in said lip include a central notch above the axis of said center wheels and a series of notches extending on either side of the said central notch.

References Cited by the Examiner
UNITED STATES PATENTS

| 980,621 | 1/1911 | Finch | 188—29 |
|---|---|---|---|
| 1,047,009 | 12/1912 | Edgington | 180—19 |
| 2,191,327 | 2/1940 | Snyder | 188—22 X |
| 2,649,965 | 8/1953 | King et al. | 280—47.16 X |
| 2,715,535 | 8/1955 | Prowinsky | 280—47.16 |

BENJAMIN HERSH, *Primary Examiner.*

J. A. PEKAR, *Assistant Examiner.*